Dec. 8, 1964 T. H. HEINE 3,160,386
COUPLING DEVICE
Filed May 15, 1961 3 Sheets-Sheet 1

INVENTOR.
THOMAS H. HEINE.
BY
ATTORNEY.

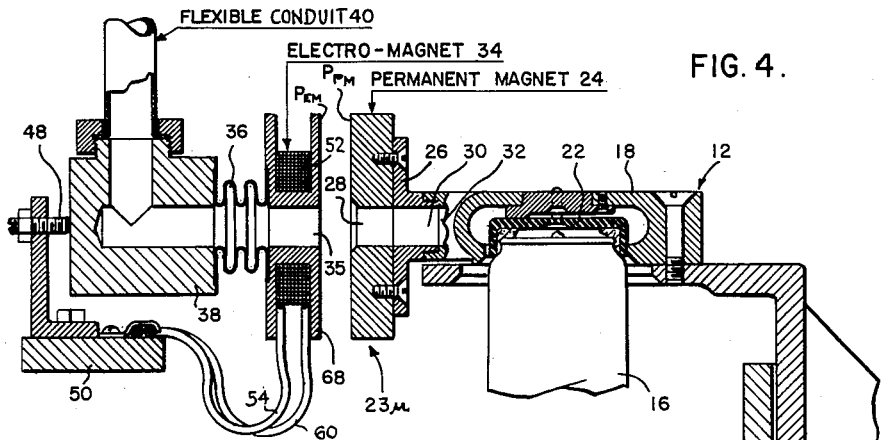
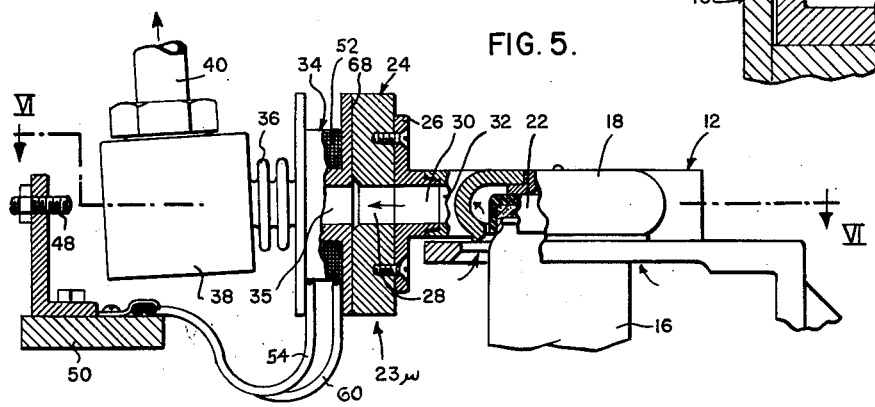
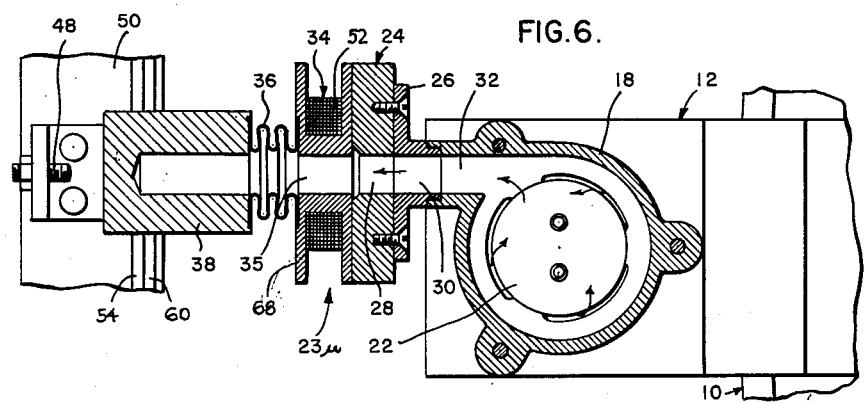

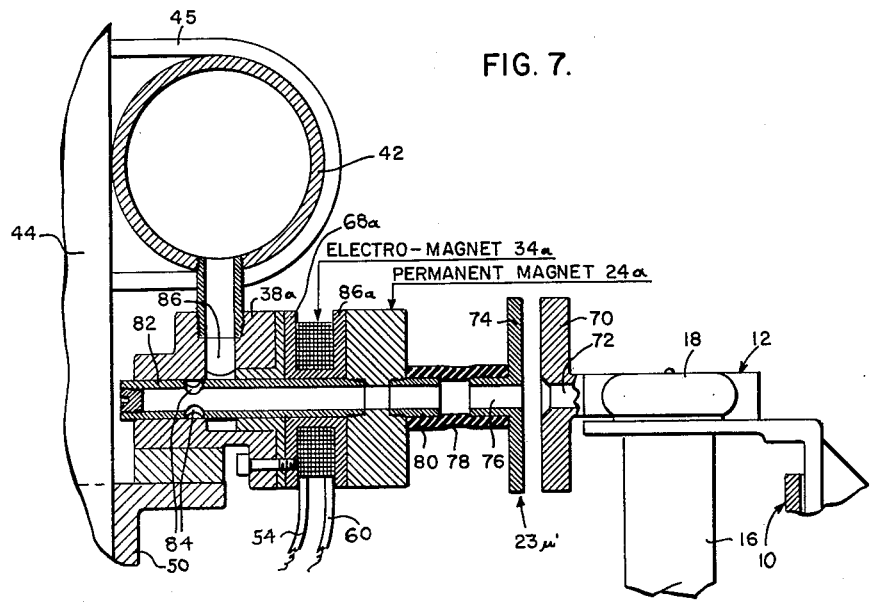
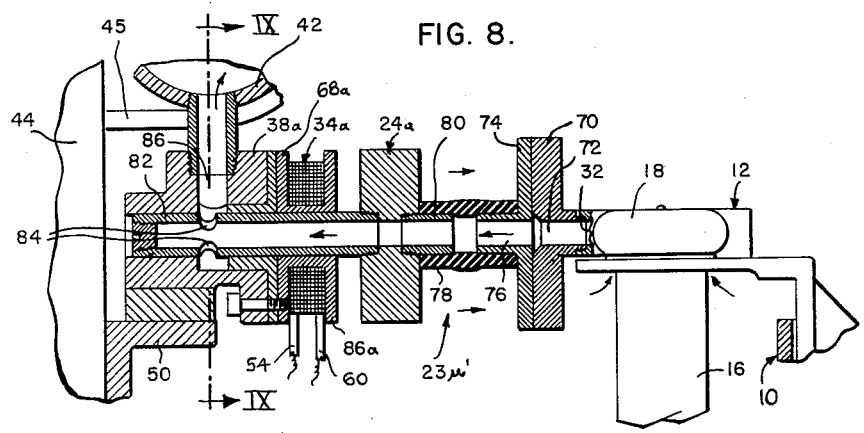
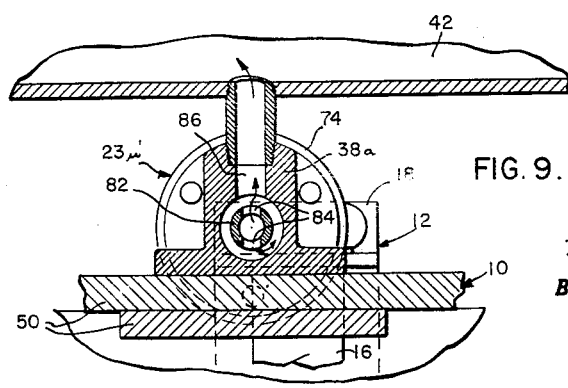

United States Patent Office 3,160,386
Patented Dec. 8, 1964

3,160,386
COUPLING DEVICE
Thomas H. Heine, Cedar Grove, N.J., assignor to Westinghouse Electric Corporation, East Pittsburgh, Pa., a corporation of Pennsylvania
Filed May 15, 1961, Ser. No. 110,119
3 Claims. (Cl. 251—149.1)

The present invention relates to basing machines for incandescent lamps and discharge devices and, more particularly, to an improved coupling device for such a machine.

Currently, fluorescent lamps are satisfactorily based on apparatus and by the method (disclosed in U.S. patent application Serial No. 42,041 filed July 11, 1960, now Patent No. 3,063,492 of Nov. 13, 1962, by T. H. Heine et al. and assigned to the assignee of the present invention) at a faster rate than on a conventional basing machine of the type shown in U.S. Patent No. 2,439,884 issued April 20, 1948 to J. M. Campbell. Since the patented basing machine is not provided with a rotary valve means, such as is employed in the apparatus of the above-mentioned application, such patented basing machine (which may still possess many useful years of service) can only be converted to the improved apparatus and method at a considerable expense.

As an economical means of adapting the patented basing machine to practice the improved method of basing of the above-mentioned application, such patented basing machine is equipped with improved basing chucks (of the type disclosed in U.S. patent application Serial No. 652,466 filed April 12, 1957, now Patent No. 3,013,927 of Dec. 19, 1961, by T. F. McDougal and assigned to the assignee of the present invention), and with vacuum manifolds connected to suction blowers. Since the rotary turret of the patented basing machine is often out of round, variations in the width of the air gap between the indexable chucks and the fixed vacuum manifolds result. In addition, variations in the length of the lamps disturb the registry and alignment between the fixed lower vacuum manifold and the spring-biased lower chuck which supports the lamp. The result in each case is a variable flow of air across the air gap with resultant undesirable variations in the basing operation.

It is the general object of the present invention to avoid and overcome the foregoing and other difficulties of and objections to prior-art practices by the provision of an improved coupling device for a basing machine, which coupling device permits the inexpensive modernization of conventional basing machines and adapts such conventional basing machines for controlled, faster and more efficient operation.

Another object of the present invention is the provision of an improved coupling device for substantially hermetically sealing a basing chuck to a fluid moving means during the dwell of such chuck at an operating station of the basing machine, thus eliminating the undesirable variables in the basing operation heretofore caused by air gap and lamp length variations.

A further object of the present invention is the provision of an improved coupling device for a basing machine, which improved coupling device has its operating parts disposed away from the heated portions of the basing machine thus prolonging the operative life of such operating parts and reducing the required maintenance thereon.

Yet another object of the present invention is the provision of an improved coupling device for a basing machine, which coupling device prevents the useless evacuation of the ambient atmosphere when the coupling device is in the open position.

The aforesaid objects of the present invention, and other objects which will become apparent as the description proceeds, are achieved by providing a coupling device for connecting a basing chuck to a fluid moving means in substantially hermetic engagement therewith. This coupling device has a first sealing means connected to the basing chuck and provided with a first conduit means in communication with the interior of the basing chuck, a second sealing means disposed in spaced relation with respect to the first sealing means and provided with a second conduit means connected to the fluid moving means and in communication therewith. One of the sealing means is movable with respect to the other sealing means to permit the one sealing means to move into engagement with the other sealing means. Drive means are operatively associated with the one sealing means for moving the one sealing means into substantially hermetic engagement with the other sealing means thereby permitting the flow of fluid through the basing chuck, the first conduit means and the second conduit means.

For a better understanding of the present invention reference should be had to the accompanying drawings, wherein like numerals of reference indicate similar parts throughout the several views and wherein:

FIG. 4 is an enlarged fragmentary vertical-sectional view of the upper coupling device and basing chuck shown in FIG. 2;

FIG. 5 is a view simialr to FIG. 4 showing the coupling device in the closed position at time "b—b" of FIG. 3;

FIG. 6 is a horizontal-sectional view along the line VI—VI of FIG. 5 in the direction of the arrows;

FIG. 7 is a view similar to FIG. 4 of an alternative embodiment of the coupling device shown in the open position at time "a—a" of FIG. 3 but with the conduit which connects the manifold to the suction blower omitted for clarity;

FIG. 8 is a view similar to FIG. 7 of the coupling device shown in the closed position at time "b—b" of FIG. 3;

FIG. 9 is a vertical-sectional view along the line IX—IX of FIG. 8 in the direction of the arrows.

Although the principles of the coupling device of the present invention are broadly applicable to basing machines for incandescent lamps and discharge devices, the present invention is particularly adapted for use in conjunction with a fluorescent-lamp basing machine and hence it has been so illustrated and will be so described.

Figure 1:
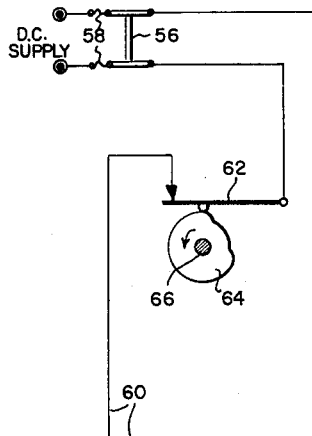
FIG. 1 is a diagrammatic plan view of a basing machine wherein the improved coupling devices are incorporated.

With specific reference to the form of the present invention illustrated in the drawings, and referring particularly to FIG. 1, a basing machine for fluorescent lamps (of the type disclosed in above-mentioned U.S. Patent No. 2,439,884) is shown diagrammatically in such figure and has a turret indicated generally by the reference numeral 10.

This turret 10 (FIGS. 1, 2, 4 and 6–9) carries forty-eight heads 12 (FIGS. 1, 2 and 4–9) which heads 12 are indexable by a drive and indexing mechanism 14 (FIG. 1, of the type shown in U.S. Patent No. 2,569,852 issued October 2, 1951 to J. H. Green) through a like number of stations. At Stations "1" and "2" a fluorescent lamp 16 (FIGS. 2, 4–5 and 7–9) is loaded into a fixed upper chuck 18 (FIGS. 2 and 4–9) and a reciprocable lower chuck 20 (FIG. 2) so that bases 22 (FIGS. 4, 5 and 6) on each end of such fluorescent lamp 16 are secured in the chucks 18 and 20. Each head 12 comprises an upper chuck 18 and a registering lower chuck 20. From Station "3" through Station "23" (FIG. 1) the bases 22 are heated and cured. Between Stations "30" and "41" the bases 22 are preliminarily cooled and set. At Stations "42" through "45" the bases 22 are finally cooled and set at an accelerated rate by operation of the improved coupling devices 23u (FIGS. 2, and 4–6) and 23L (FIG. 2) of the present invention, for connecting the upper chuck 18 and lower chuck 20 respectively of a head 12 (indexing into these stations) to a fixed fluid moving means thereat. It will be understood that the final setting and cooling operation is not limited to four work stations, as shown in FIG. 1, but may include as many work stations as desired.

Figure 2:
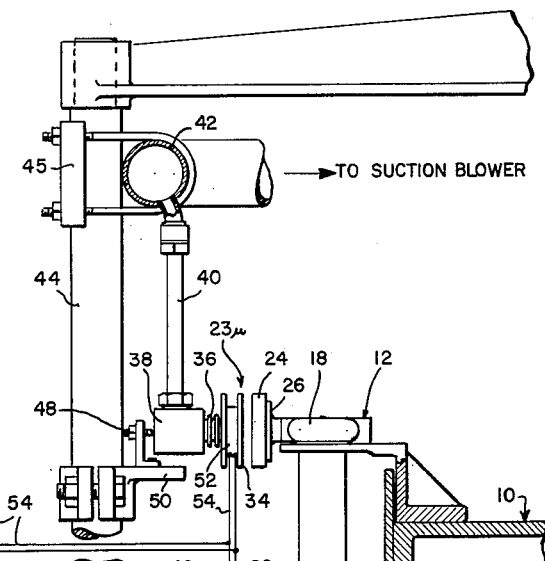
FIG. 2 is an enlarged fragmentary vertical-sectional view along the line II—II of FIG. 1 in the direction of arrows and showing a pair of improved coupling devices in the open position at Station "43," a final cooling and setting station, at the time "a—a" of FIG. 3.

Since the coupling devices 23u and 23L (as shown in FIG. 2) for the upper chuck 18 and lower chuck 20 respectively are essentially the same, it is deemed sufficient to describe the upper coupling device 23u associated with the upper chuck 18 (FIGS. 4–6). This upper coupling device 23u has a first sealing means, such as a washerlike permanent magnet 24 (FIGS. 2 and 4–6), connected by a flanged hollow sleeve 26 of a non-magnetic material, such as brass, to the upper chuck 18 and provided with a first conduit means, such as a central bore 28 (FIGS. 4–6). This central bore 28 (FIG. 6) in the permanent magnet 24 and a central bore 30 (FIGS. 4–6) in the sleeve 26 constitute a registering continuation of an outlet (or inlet) aperture 32 (FIGS. 4–5, 6 and 8) in the upper chuck 18.

The permanent magnet 24, suitably a ceramic permanent magnet of the type designated "Ceramagnet" by Stackpole Carbon Co., St. Marys, Pa., has unusual resistance to demagnetization (i.e. possesses an extremely high coercive force, the force needed to demagnetize such magnet) and can be heated to temperatures of about 450° C before such ceramic permanent magnet is demagnetized. This ceramic permanent magnet 24 is for practical purposes a non-conductor, has a linear decrease and increase in residual magnetism with temperature increase and decrease respectively, is lighter in weight than a metallic magnet, is chemically inert, and can readily be cast in the desired cylindrical or washer-like shape shown in FIGS. 4–6.

To the left of the permanent magnet 24, as viewed in FIGS. 2 and 4–6, a second sealing means, such as an electromagnet 34 (provided with a second conduit means or bore 35, FIGS. 4–6,) is connected by a metallic non-magnetic bellows 36 (FIGS. 2 and 4–6) to a non-magnetic block or elbow 38, which elbow 38 is connected in turn by a flexible conduit 40 (FIGS. 2, 4 and 5) to a fixed manifold 42. This manifold 42 (FIGS. 2, 7 and 8) is mounted by means of a bracket 45 on a mount rod 44 upstanding from the frame 46 (FIG. 2) of the basing machine and is in communication with a suction blower (not shown) or an air blower (not shown). The manifold 42 and either the suction blower or air blower (both not shown) together with the flexible conduit 40, elbow 38, and bellows 36 constitute the above-mentioned fluid moving means.

In order to limit the movement of the elbow 38 to the left, as viewed in FIGS. 2 and 5–6, an adjustable stop 48 is mounted on the mount rod 44 by means of a bracket 50. One side of a coil 52 (FIGS. 2 and 4–6) of the electromagnet 34 is connected by a conductor 54 (FIGS. 2, 4 and 5) through one side of a manually operated switch 56 (FIG. 2) and a fuse 58 to one side of a D.C. supply identified by the legend "D.C. Supply." In turn, a line 60 (FIGS. 2, 4 and 5) joins the other side of the coil 52 through a cam operated switch 62 (FIG. 2), through the other side of the switch 56 and through a fuse 58 to the other side of the D.C. supply. The cam operated switch 62 is operated by a cam 64 (FIG. 2) on a main cam shaft 66 of the basing machine.

Figure 3:
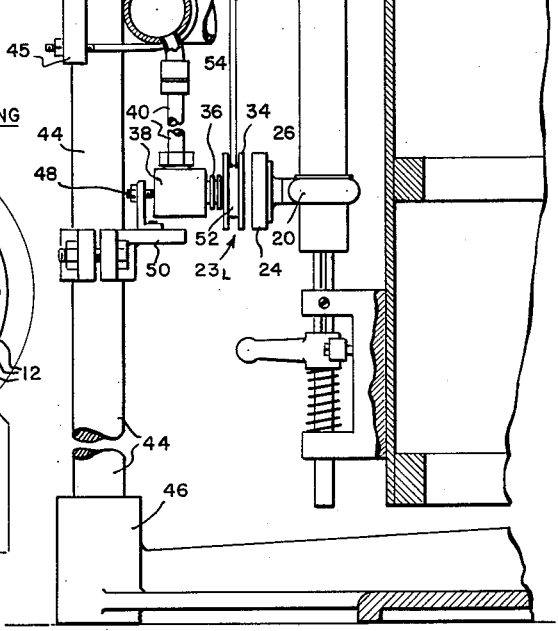
FIG. 3 is a diagram illustrating the operation of the coupling devices with respect to the indexing of the basing chucks.
Figure 3:
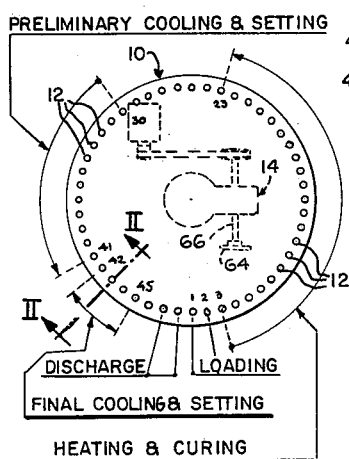
Figure 3:
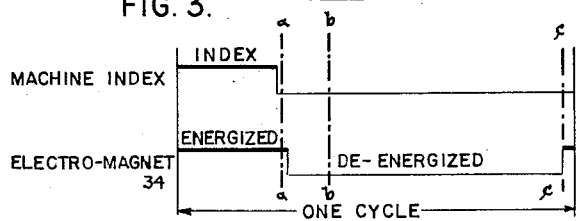

It will be understood from a consideration of FIG. 3 that while a head 12 and the lamp 16 carried thereby are indexing into Station "43" (FIG. 1), as for example "a—a" FIG. 3, the electromagnet 34 is energized so that the opposed poles "$P_{EM}$" and "$P_{PM}$" of each electromagnet 34 and each registering permanent magnet 24 respectively have the same polarity with resultant repulsion of the movable electromagnet 34 away from its associated permanent magnet 24 against the stop 48 as shown in FIG. 1. When the head 12 and lamp 16 have completed their index into Station "43," the cam 64 opens the switch 62 thus deenergizing the electromagnet 34 and permitting the permanent magnet 24 to attract a core 68 (FIGS. 4–6) of the electromagnet 34 and to move such core 68 from the position shown in FIG. 4 to the position shown in FIG. 5, where such core 68 is in substantially hermetic engagement with the permanent magnet 24 and their respective bores 35 and 28 are in communication with each other. The drive means, operatively associated with the core 68 of the electromagnet 34 for moving the latter into substantially hermetic engagement with the permanent magnet 24, is of course the magnetic attraction of the permanent magnet 24 for such core 68.

As a result ambient air is continously (and efficiently without loss thereof) sucked into the chuck 18, FIGS. 5 and 6, and around the base 22 in the direction of the arrows to provide controlled faster and more efficient cooling of the base 22 during the time (FIG. 3) which the electromagnet 34 is deenergized.

It will be understood by those skilled in the art that the positions of the electromagnet 34 and the permanent magnet 24 (FIGS. 2 and 4–6) may be interchanged without effecting the operation of the coupling device 23u.

Further, in the case where the air gap between the electromagnet 34 and permanent magnet 24 is relatively large, the attraction between the electromagnet 34 and the permanent magnet 24 may be increased by reversing the current through the electromagnet 34 by means of a reversing switch (not shown in FIG. 2) so that the opposed poles "$P_{EM}$" and "$P_{PM}$" are of opposite polarity.

Alternatively, as shown in FIGS. 7–9, in order to prevent useless evacuation of the ambient air by the suction blower (not shown) when the coupling devices are open and further in order to maintain the magnetic elements of the coupling devices further away from the heated chucks 18 and 20 and heated bases 22, coupling devices similar to an upper coupling device 23u' shown in such figures are employed.

In FIGS. 7–8, a metallic non-magnetic disc 70 (provided with a bore 72) is mounted on the upper chuck 18 as a continuation of the outlet aperture 32 in such upper chuck 18. To the left of the disc 70 (FIGS. 7 and 8) a cooperating disc 74 (FIGS. 7–9) has a hollow hub portion 76 resiliently connected by a rubber nipple 78 to a metallic nipple 80 projecting from the right-hand side (FIGS. 7–8) of a permanent 24a. A hollow metallic non-magnetic sleeve 82 (FIGS. 7–9) projects from the left-hand side of the electromagnet 34a (FIGS. 7–8), and is slidable in a core 68a of an electromagnet 34a (mounted on a fixed block or elbow 38a) and in the fixed elbow 38a. In order to permit the sleeve 82 to function as a slide valve, the left-hand end of the sleeve 82 (FIGS. 7 and 8) is plugged and such sleeve 82 is provided with apertures 84 which register with a vertical opening 86 in the elbow 38a when the coupling device 23u' is in the closed position shown in FIG. 8, thus permitting evacuation of the upper chuck 18. When the coupling device 23u' is in the open position shown in FIG. 7, the apertures 84 are not aligned with the vertical opening 86 and the useless evacuation of ambient air through the disc 74, permanent magnet 24a and slidable sleeve 82 is prevented.

Since the coupling device 23u′ (FIGS. 7–9) operates in a different manner from the coupling devices 23u and 23L, shown in FIG. 2, it will be understood by reference to FIG. 3 that during index of a head 12 and the lamp 16 carried thereby, the electromagnet 34a is deenergized. During the dwell of the head 12, the electromagnet 34a is energized. After a basing head 12 and the lamp 16 carried thereby index, for example into Station "43," the electromagnet 34a is energized so that the opposed poles of the electromagnet 34a and the permanent magnet 24a respectively have the same polarity. As a result the permanent magnet 24a is repulsed by the electromagnet 34a and is moved to the right, as viewed in FIGS. 7 and 8, from the open position shown in FIG. 7 to the closed position in FIG. 8 so that the disc 74 engages (and is in substantially hermetic engagement with) the disc 70 and so that the pair of apertures 84 (FIGS. 7–9) in the sleeve 82 register with the vertical opening 86 in the elbow 38a. Thereafter for a period substantially the same as that indicated in FIG. 3, ambient air is sucked into the upper chuck 18, around the base 22 and through the coupling device 23u′ in the direction of the arrows shown in FIGS. 8 and 9. At the time "c—c" shown in FIG. 3, the electromagnet 34a is deenergized and the coupling device 23u′ moves from the closed position shown in FIG. 8 to the open position shown in FIG. 7 thus permitting the subsequent indexing of the head 12 and the lamp 16 carried thereby to the next cooling station.

At either Stations "47" or "48" the lamp 16 (with the basing cement between the bases 22 and the lamp envelope now finally cooled and set) is discharged from the head 12 of the basing machine.

It will be recognized by those skilled in the art that the objects of the present invention have been achieved by the provision of an improved coupling device for a basing machine, which coupling device eliminates the undesirable variables in the basing operation heretofore caused by variations in air gap and lamp length. This improved coupling device permits the inexpensive modernization of the conventional basing machines thus adapting such conventional basing machines for controlled, faster and more efficient operation. Further such improved coupling device prevents the useless evacuation of ambient air when the coupling device is in the open position and has its operating elements disposed away from the heated portions of the basing machine thereby prolonging the life of such operating elements and reducing maintenance thereon.

While in accordance with the patent statutes a preferred embodiment of the present invention has been illustrated and described in detail, it is to be particularly understood that the invention is not limited thereto or thereby.

I claim:

1. Apparatus for substantially hermetically connecting the interior portion of a hollow basing chuck to a gas moving means to cause a flow of gas through the interior portion of such basing chuck, said apparatus comprising:
    (a) first sealing means connecting to said basing chuck and provided with first conduit means communicating with the interior portion of said basing chuck;
    (b) second sealing means normally disposed in spaced relation with respect to said first sealing means and provided with second conduit means;
    (c) electromagnetic means mounted on said gas moving means and provided with third conduit means reciprocable therein and communicating with said gas moving means, and said third conduit means connected to and communicating with said second conduit means;
    (d) magnetic means reciprocable with respect to said electromagnetic means and having said second and said third conduit means connected thereto, said magnetic means also resiliently connecting to said second sealing means;
    (e) said magnetic means operable by means of magnetic attraction when asid electromagnetic means is deenergized to move said second sealing means into normal spaced relation with respect to said first sealing means; and
    (f) said magnetic means operable by means of magnetic repulsion when said electromagnetic means is energized to move said second sealing means into substantially hermetic engagement with said first sealing means to join in communication said second conduit means and said first conduit means to permit gas flow from the interior of said basing chuck to said gas moving means.

2. The apparatus as specified in claim 1, wherein a valve means connected to said third conduit means, when said electromagnetic means is energized said valve means is open to permit passage of gas from said third conduit means to gas moving means, and when said electromagnetic means is deenergized said valve means is closed to prevent passage of gas from said third conduit means to said gas moving means.

3. Apparatus for disconnecting and connecting the interior portion of a hollow basing chuck from and onto a gas moving means, respectively to interrupt and to create a flow of gas through the interior portion of such basing chuck, said apparatus comprising:
    (a) first sealing means formed of permanent magnetic material and connecting to said basing chuck, said first sealing means provided with first conduit means communicating with the interior portion of said basing chuck;
    (b) second sealing means provided with second conduit means communicating with said gas moving means, said second sealing means including an electromagnet as well as a core portion which is attracted by said permanent magnet first sealing means, said second sealing means normally disposed in substantially hermetic engagement with said permanent magnet first sealing means by the attraction thereof for said core portion to engage said first and second conduit means and permit said gas moving means to create a flow of gas through the interior of said basing chuck, said first conduit means and said second conduit means;
    (c) said second sealing means movable away from said permanent magnet first sealing means to effect disengagement between said first and second conduit means and interrupt the flow of gas through the interior of said basing chuck and said first conduit means; and
    (d) power supply means operatively associated with said electromagnet for creating a repulsion between said permanent magnet first sealing means and said electromagnet to move said second sealing means away from said permanent magnet first sealing means and disengage said second conduit means from said first conduit means.

References Cited in the file of this patent

UNITED STATES PATENTS

| | | |
|---|---|---|
| 1,973,610 | Commors | Sept. 11, 1934 |
| 2,357,013 | McKinnis | Aug. 29, 1944 |
| 2,439,884 | Cambell | Apr. 20, 1948 |
| 2,725,919 | Brent | Dec. 6, 1955 |
| 2,965,136 | Burris | Dec. 20, 1960 |
| 3,013,927 | McDougal | Dec. 19, 1961 |